H. P. TROUTMAN.
CORN HARVESTER.
APPLICATION FILED NOV. 7, 1910.
1,017,823.
Patented Feb. 20, 1912.
2 SHEETS—SHEET 2.
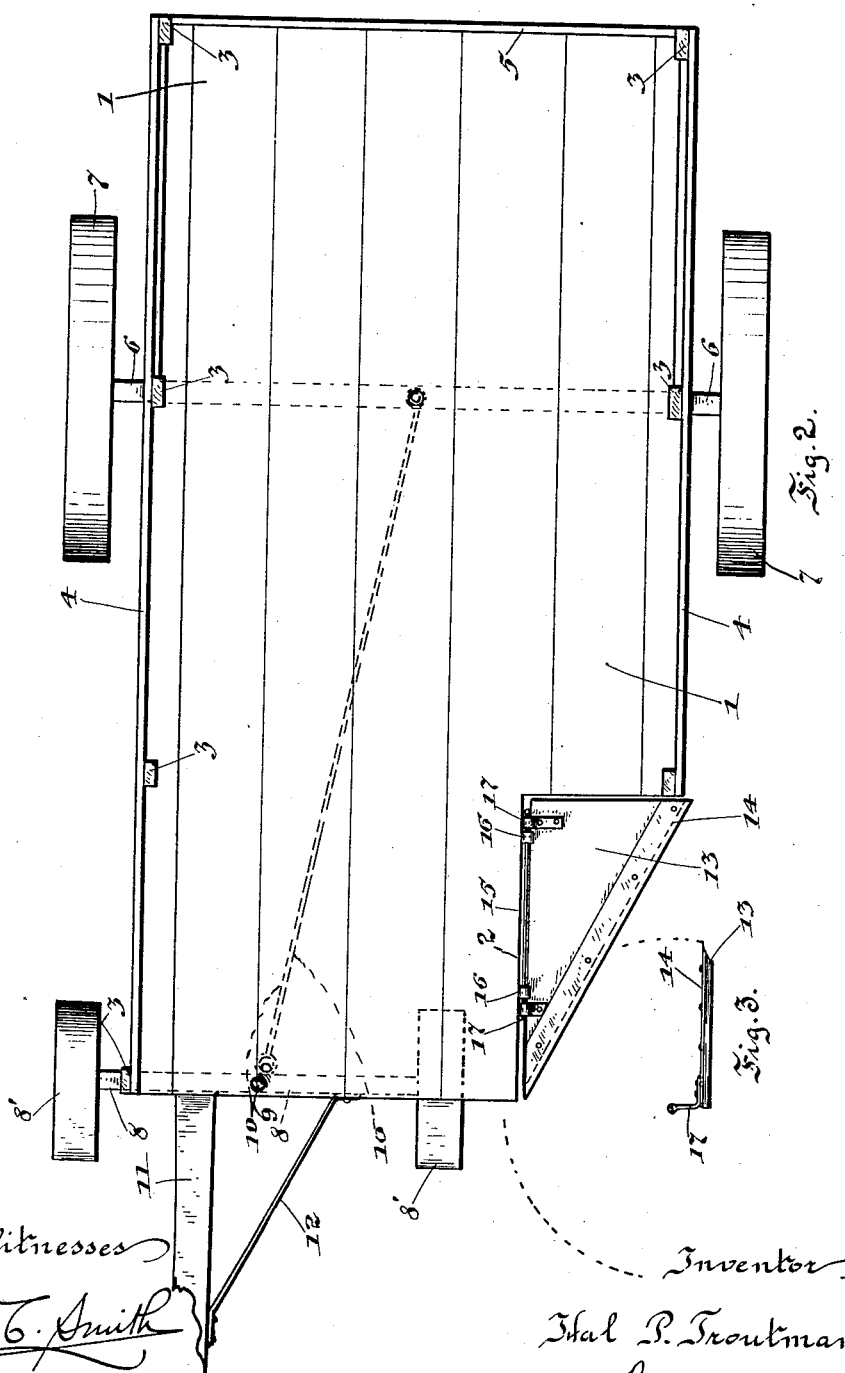

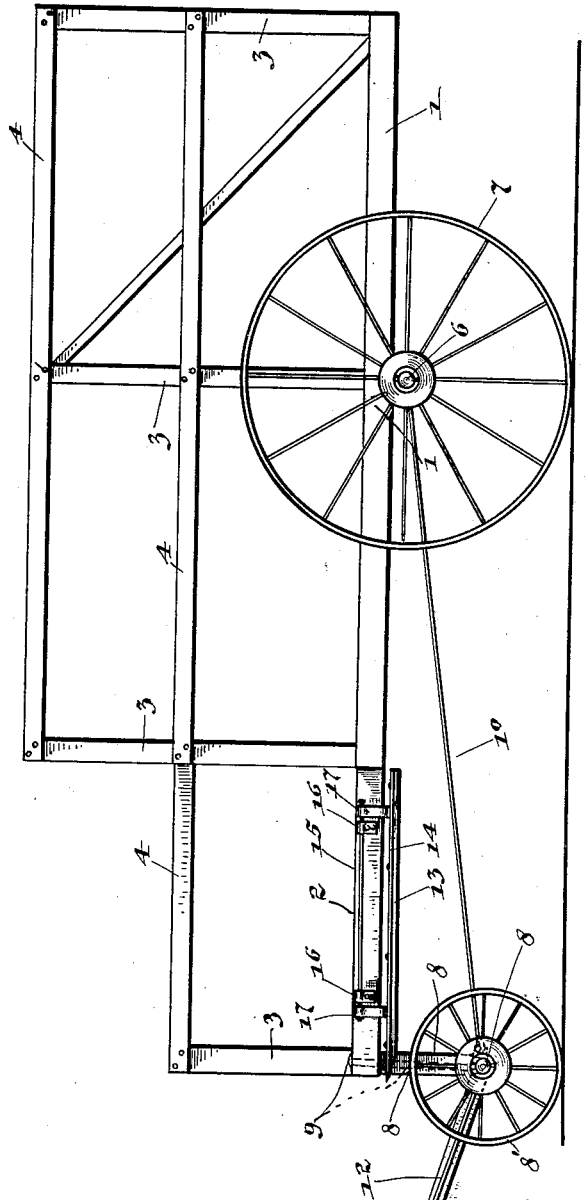

UNITED STATES PATENT OFFICE.

HAL P. TROUTMAN, OF KEWANNA, INDIANA.

CORN-HARVESTER.

1,017,823. Specification of Letters Patent. Patented Feb. 20, 1912.

Application filed November 7, 1910. Serial No. 591,077.

*To all whom it may concern:*

Be it known that I, HAL P. TROUTMAN, a citizen of the United States, and a resident of the city of Kewanna, county of Fulton, and State of Indiana, have invented certain new and useful Improvements in Corn-Harvesters, of which the following is a specification.

My invention relates to improvements in corn harvesters, the object being to provide a machine of this character which shall be simple of construction and efficient in operation.

My invention consists in the novel construction and arrangements of parts as will be hereinafter fully described and more particularly pointed out in the appended claim.

My invention will be more readily understood by reference to the accompanying drawings forming a part of this specification, and in which—

Figure 1 is a side elevation of my improved corn harvester in its preferred form, Fig. 2 is a top plan view thereof, and Fig. 3 is a detail front elevation.

The preferred construction for carrying my invention into effect as illustrated in the accompanying drawings comprises a substantially rectangular main frame 1 having a recess or cut-away portion 2 in one of the front corners thereof. The frame 1 comprises vertical standards 3, horizontal longitudinal members 4, and a transverse member 5, these members forming an inclosure or body for the corn after being severed from the stalk. The frame 1 is mounted upon a rear axle 6 having supporting wheels 7 and upon a front axle 8 having supporting wheels 8′, a connecting link 10 being provided between said axles. An ordinary king-bolt 9 is provided by means of which the front end of the frame is pivoted to axle 8. An ordinary draft pole or tongue 11 extends forwardly from the front axle 8 and is held securely in position by means of a brace 12 as shown in Fig. 2. It will be observed that one of the front wheels 8′ is positioned within the line of travel of the corresponding wheel 7 so that said wheels pass on opposite sides of a row of corn.

The cutter 13 is provided with a cutting edge 14 which is adapted to sever the corn stalks, the frame 1 being designed to travel so that the corn stalks will contact approximately in the middle of said cutting edge 14. The cutter 13 is triangular in form and is hinged in the recess 2 as shown in Fig. 2. The hinged connection of the cutter 13 with the frame 1 comprises a hinge rod 15 which passes through perforated straps 16 and 17, the straps 16 being secured in said recess and the straps 17 being L-shaped in form as shown in Fig. 3. From this construction it is apparent that the cutter 13 when not in use may be turned over upon the frame 1 as indicated by dotted lines in Fig. 3.

In operation the stalks of corn after being severed will be deposited upon the frame 1. The wheels of the machine are spaced to travel between the corn rows, hence the driver or operator of the machine must guide the same properly in order to perform the function for which it is intended.

A corn harvester of the construction set forth is extremely simple of construction and highly efficient in operation.

While I have shown what I deem to be the preferable form of my invention I do not wish to be limited thereto as there might be various changes made in the details of construction and the arrangements of parts described, without departing from the spirit of the invention, and hence I desire to avail myself of such variations and modifications as come within the scope of the appended claim.

Having described my invention what I claim as new and desire to secure by Letters Patent is:

In a corn harvester, a frame comprising a flat unobstructed platform mounted upon wheels and having a rectangular recess in one of its forward corners, and a rail extending along the sides and across the rear end of the platform, said rail terminating on the side with said recess at the rear end thereof, a triangular cutting blade arranged in said recess and having its cutting edge extending from the inner forward corner of said recess to a point slightly beyond the rear outer corner thereof, and a hinged connection between the inner longitudinal edge of said blade and the adjacent edge of said platform, said hinged connection being adapted to normally hold the blade in horizontal operative position, substantially as described.

In testimony whereof I have signed my name to this specification in the presence of two subscribing witnesses.

HAL P. TROUTMAN.

Witnesses:
ADRON HUDKINS,
HARRY GARMAN.

Copies of this patent may be obtained for five cents each, by addressing the "Commissioner of Patents, Washington, D. C."